United States Patent
Zhang et al.

(10) Patent No.: US 10,200,293 B2
(45) Date of Patent: Feb. 5, 2019

(54) DYNAMICALLY OFFLOADING FLOWS FROM A SERVICE CHAIN

(71) Applicant: Futurewei Technologies, Inc., Plano, TX (US)

(72) Inventors: Hong Zhang, Palo Alto, CA (US); Louis Fourie, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 589 days.

(21) Appl. No.: 14/884,523

(22) Filed: Oct. 15, 2015

(65) Prior Publication Data

US 2016/0112337 A1 Apr. 21, 2016

Related U.S. Application Data

(60) Provisional application No. 62/066,061, filed on Oct. 20, 2014.

(51) Int. Cl.
*H04L 12/801* (2013.01)
*H04L 29/06* (2006.01)

(52) U.S. Cl.
CPC .............. *H04L 47/35* (2013.01); *H04L 47/17* (2013.01); *H04L 69/22* (2013.01)

(58) Field of Classification Search
CPC .......... H04L 47/17; H04L 47/35; H04L 69/22
USPC ................ 370/216, 228, 237, 401
See application file for complete search history.

(56) References Cited

U.S. PATENT DOCUMENTS

| 7,860,100 | B2 | 12/2010 | Khalid et al. | |
| 2008/0008194 | A1* | 1/2008 | Goffin | H04L 67/327 370/401 |
| 2014/0029418 | A1* | 1/2014 | Jain | H04L 41/0668 370/228 |
| 2016/0099864 | A1* | 4/2016 | Akiya | H04L 45/28 370/216 |

OTHER PUBLICATIONS

Inside Secure, "Technical Considerations for Mobile Data Offload with ePDG," White Paper, 9 pages. Available Nov. 24, 2015, http://www.insidesecure.com/Products-Technologies/Protocol-Security-Toolkits/QuickSec-R-Mobile-VPN-Client/Whitepapers/Technical-Considerations-for-Mobile-Data-Offload-with-ePDG.
Zhang, H., et al., "Service Chain Header," Network Working Group Internet Draft, May 9, 2014, 15 pages.

* cited by examiner

*Primary Examiner* — Melvin C Marcelo
*Assistant Examiner* — Natali Pascual Peguero
(74) *Attorney, Agent, or Firm* — Slater Matsil, LLP

(57) ABSTRACT

Dynamically by-passing a service function instance on a service chain after the service function instance has processed the first few packets of a traffic flow may improve the overall processing efficiency of the service chain. When using a control plane mechanism, a service function instance communicates a by-pass indication to a control plane entity to prompt the control plane entity to re-route remaining portions of the traffic flow around the service function instance. When using a data plane mechanism, a service function instance includes a by-pass indication in a service chain header (SCH) of a packet in a traffic flow, and forwards the packet to a data plane entity. The by-pass indication will prompt the data plane entity to re-route remaining portions of the traffic flow around the service function instance.

20 Claims, 4 Drawing Sheets

DYNAMICALLY OFFLOADING FLOWS FROM A SERVICE CHAIN

This patent application claims priority to U.S. Provisional Application No. 62/066,061, filed on Oct. 20, 2014 and entitled "Dynamically Offloading Flows from a Service Chain," which is hereby incorporated by reference herein as if reproduced in its entirety.

TECHNICAL FIELD

The present invention relates to telecommunications, and, in particular embodiments, to techniques for dynamically offloading packet flows from a service function within a service chain.

BACKGROUND

A service chain is composed of a sequence of service function instances that reside on various service nodes. When a traffic flow is forwarded over a service chain, the packets are processed by the various service function instances, with each service function instance applying a service function (e.g., firewall, network access translation (NAT), deep packet inspection (DPI), etc.) prior to forwarding the packet to the next service node. In some implementations, a service function instance may only need to access the first few packets of a traffic flow to perform the function, or to determine whether the function needs to be performed on the flow. For instance, a service function instance receiving a particular type of traffic flow (e.g., a long-lived flow) may complete the service function using the initial packets and without processing/receiving subsequent packets of the flow. As one example, a service function instance performing firewall processing may determine that a flow is benign based on the initial packets. As another example, a service function instance performing DPI processing may only need to inspect the first few packets of a traffic flow to extract the identification information. As yet another example, a service function instance performing content delivery network (CDN) caching may learn early on that content in a traffic flow does not satisfy a caching criterion, at which point there is no processing (e.g., caching) to be performed on the remaining packets.

SUMMARY

Technical advantages are generally achieved, by embodiments of this disclosure which describe techniques for dynamically offloading flows from a service chain.

In accordance with an embodiment, a method for dynamically offloading flows from a service chain is provided. In this example, the method includes receiving a first portion of a traffic flow over the service chain path from a service function instance. The service function instance is positioned between an upstream service function instance and a downstream service function instance on the service chain path. The method further comprises determining that a by-pass criterion is satisfied after processing at least some of the first portion of the traffic flow, embedding a by-pass indication in a service chain header (SCH) of at least one packet in the first portion of the traffic flow, and forwarding the at least one packet to a data plane entity. The by-pass indication prompts the data plane entity to re-route a remaining portion of the traffic flow directly from the upstream service function instance to a next-hop service function instance. An apparatus for performing this method is also provided.

In accordance with another embodiment, another method for dynamically offloading flows from a service chains is provided. In this example, the method includes receiving a by-pass indication message from a reporting service function instance while a traffic flow is being forwarded over a first service chain path. The reporting service function instance is positioned between an upstream service function instance and a next-hop service function instance on the first service chain path. The by-pass indication message is received after a first portion of the traffic flow has been processed by the reporting service function instance. The method further comprises sending a re-routing request message to the upstream service function instance. The re-routing request message prompts the upstream service function instance to by-pass the reporting service function instance by forwarding a remaining portion of the traffic flow directly to the next-hop service function instance. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
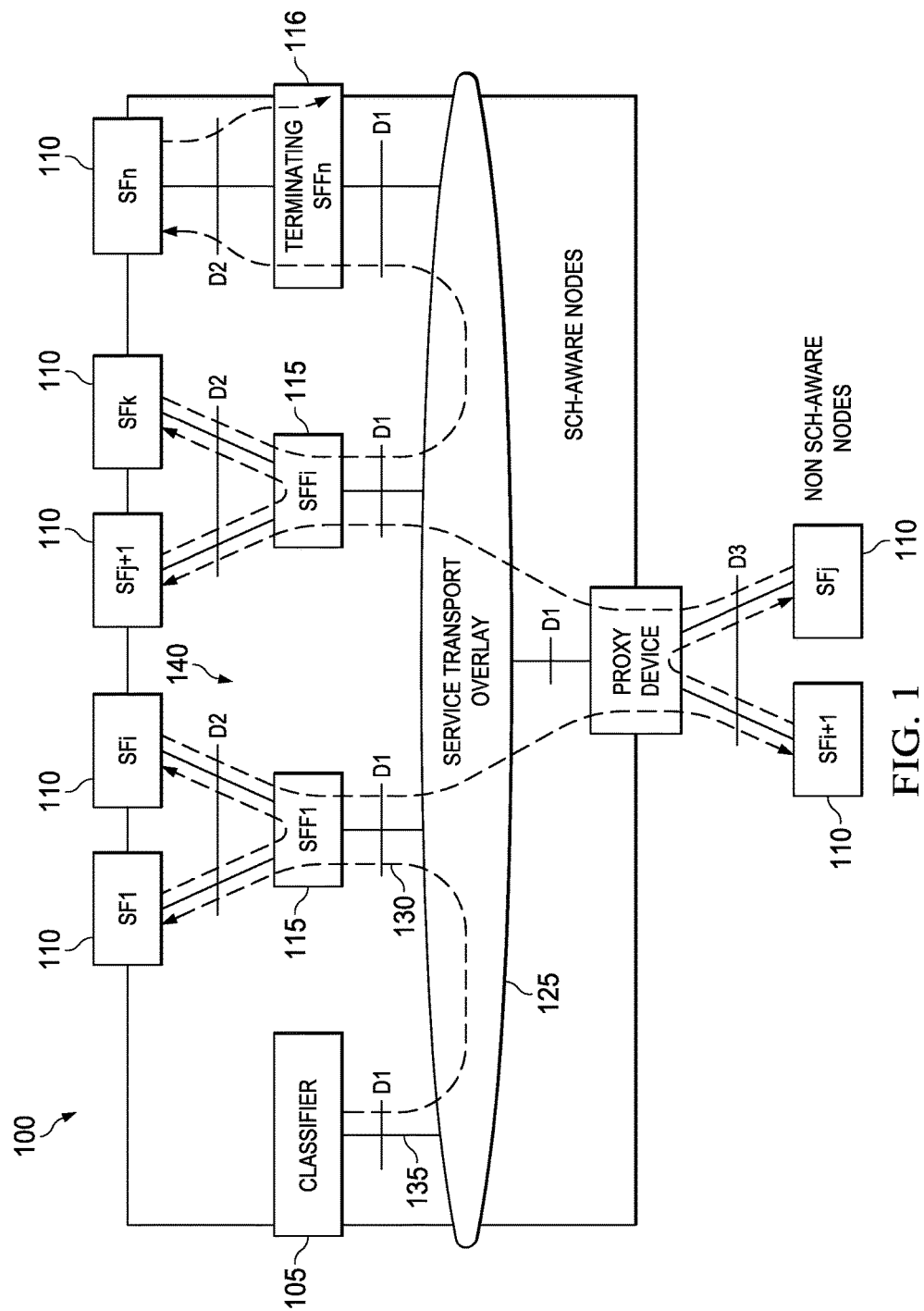
FIG. 1 illustrates a diagram of an embodiment service chain.

The making and using of embodiments of this disclosure are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

In conventional service chain architectures, all packets of a traffic flow are forwarded to each service function instance on the service chain. As a result, service function instances requiring only the first few initial packets may nevertheless receive the entire traffic flow. Accordingly, techniques for dynamically by-passing service function instances after the first few packets are needed in order to reduce processing latencies and increase the overall processing efficiencies of service chain networks.

Aspects of this disclosure provide techniques for dynamically re-routing a remaining portion of a traffic flow (e.g., the trailing packets) to by-pass a service function instance after the service function instance has processed a first portion of the traffic flow. Dynamic by-passing of a service function instance can be achieved through a control plane mechanism. When using the control plane mechanism, a service function instance will communicate a by-pass indication to a control plane entity (e.g., a service orchestrator) after processing a first portion of a traffic flow when a by-pass criterion is satisfied. In response, the control plane entity will re-route the traffic flow from the initial path (which includes the service function instance) to an alternate path (e.g., a detour) that by-passes the service function instance. This path re-routing may be achieved by communicating a re-routing instruction to an upstream node or entity, such as flow classifier or service function forwarder. The re-routing instruction may prompt the upstream node/entity to forward a remaining portion of the traffic flow (e.g., the trailing packets) on the alternate service chain path, thereby by-passing the service function instance. The by-pass indication and re-routing instructions may be communicated through control plane signaling.

Dynamic by-passing of a service function instance can also be achieved through a data plane mechanism. When using the data plane mechanism, a service function instance will include a by-pass indication (e.g., a by-pass bit a by-pass flow descriptor type length value (TLV) field, etc.) in a service chain header (SCH) appended to one or more packets in an initial portion of the traffic flow when a by-pass criterion is satisfied. Those packet(s) will then be forwarded to a data plane forwarding entity (e.g., the service function forwarder), where the by-pass indication will prompt the data plane forwarding entity to re-route a remaining portion of the traffic flow directly from the upstream service function instance to a next-hop service function instance (e.g., the service function instance following the by-passed service function instance), thereby diverting the remaining packets around the by-passed service function instance. In some embodiments, the by-passed service function instance may want to periodically sample a packet (or a group of packets) in the re-routed traffic flow. This can be accomplished by including a sampling indication (e.g., a sample flow descriptor TLV field, etc.) in the service chain header (SCH). These and other aspects are discussed in greater detail below.

FIG. 1 illustrates an embodiment service chain 100. As shown, the service chain 100 comprises a classifier 105, service function instances (e.g., service functions (SFs)) 110, service function forwarders (SFFs) 115, and a service transport overlay 125. A data plane service function chain (SFC) 130 begins at an ingress classifier 105 and extends through various SFs 110 and the SFFs 115, and then may terminate at the SFF 116. As shown, the data plane SFC 130 includes an interface D1 135 extending between the service transport overlay 125 and the classifier 105 and an interface D2 140 extending between the SF 110 and the SFF 115. The classifier 105 may be configured to classify a traffic flow. For example, the classifier 105 may determine that an incoming traffic flow is associated with the data plane SFC 130. The SFFs 115, 116 may be components of a service function forwarding plane that are responsible for forwarding packets in a traffic flow to the next-hop service function on the data plane SFC 130. The SFs 110 may be data plane entities on the data plane SFC 130 that perform service functions on traffic flows forwarded over the data plane SFC 130.

Figure 2:
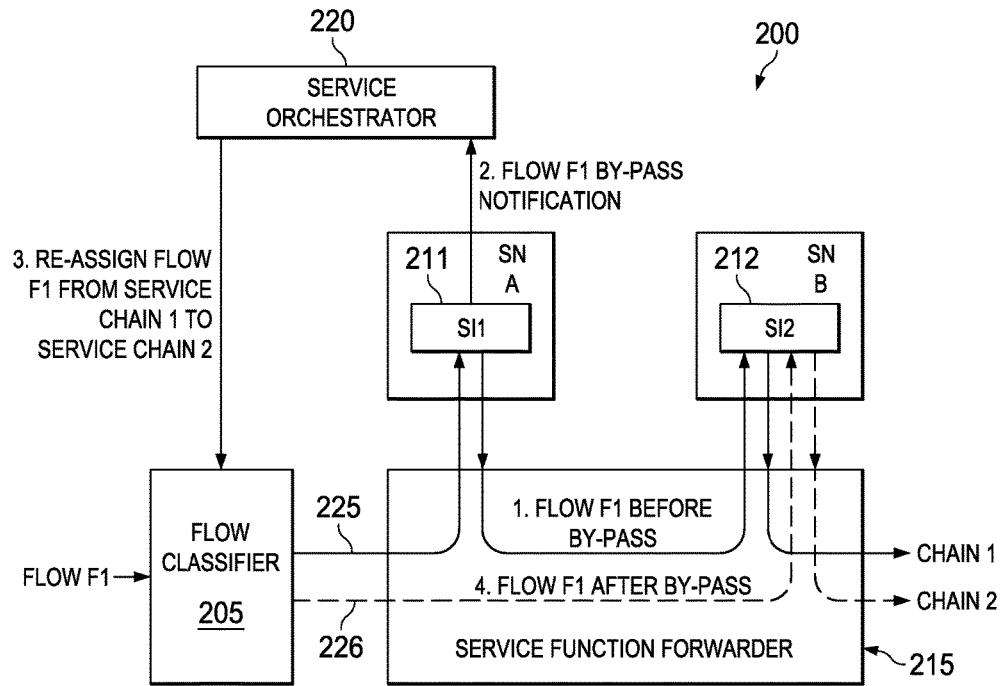
FIG. 2 illustrates a diagram of an embodiment service chain architecture adapted to dynamically by-pass service function instances using out-of-band control plane signaling.

Aspects of this disclosure provide a control plane mechanism for dynamically by-passing service function instances on a service chain path. FIG. 2 illustrates an embodiment service chain architecture 200 adapted to dynamically by-pass a first service function instance (SI1) 211 using out-of-band control plane signaling. As shown, the service chain architecture 200 comprises a flow classifier 205, service function instances 211, 212, a service function forwarder 215, a service orchestrator 220, a first service chain 225, and a second service chain 226.

When the SI1 211 has determined that it no longer needs to access any further packets for a traffic flow being transported over the first service chain 225, it sends a by-pass notification over a control channel to a service orchestrator 220 in order to request re-routing of a remaining portion of the traffic flow. When the service orchestrator 220 receives the by-pass notification from the first SI1 211, the service orchestrator 220 sends a control plane request to the upstream flow classifier 205 to re-route the first service chain 225 to the second service chain 226, thereby by-passing the SI1 211. In some embodiments, the second service chain 226 may be established prior to the service orchestrator 220 receiving the by-pass indication from the SI1 211. In other embodiments, the service orchestrator 220 dynamically establishes the second service chain 226 upon receiving the by-pass indication from the first SI1 211.

Figure 3:
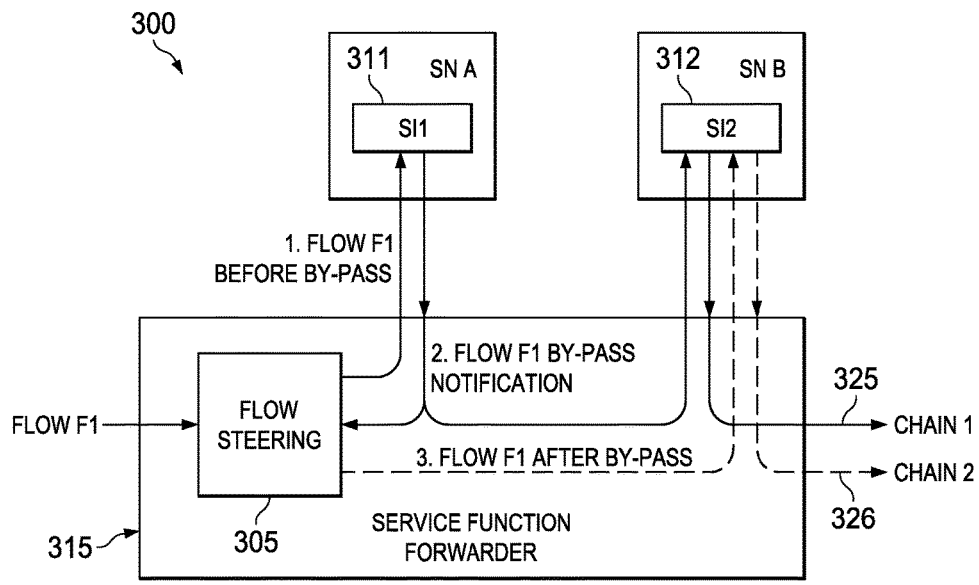
FIG. 3 illustrates a diagram of an embodiment service chain architecture adapted to dynamically by-pass service function instances using in-band data plane signaling.

Aspects of this disclosure also provide a data plane mechanism for dynamically by-passing service function instances on a service chain path. More specifically, a service function instance places a by-pass indication in a service chain header of one or more packets in a first portion of traffic flow to re-route a remaining portion of the traffic flow directly from an up-stream service function instance to the next-hop service function instance. Service chain headers (SCHs) are described in Internet Engineering Task Force (IETF) publication entitled "Service Chain Header draft-zhang-sfc-sch-01," which is incorporated herein by reference as if reproduced in its entirety. FIG. 3 illustrates an embodiment service chain architecture 300 adapted to dynamically by-pass a first service function instance (SI1) 311 using in-band data plane signaling. As shown, the service chain architecture 300 comprises a flow steering entity 305, a service function forwarder 315, service function instances 311, 312, a first service chain 325, and a second service chain 326. The SI1 311 includes a by-pass indication in the SCH of a packet in the traffic flow when a by-pass criterion is satisfied. The by-pass indication may be a dedicated by-pass bit/flag or a by-pass flow descriptor TLV. Placing the by-pass indication in the SCH of a packet in the first service chain 325 prompts the flow steering entity 305 to re-route a remaining portion of the traffic flow to the next-hop service function instance. This may be achieved by re-routing the traffic flow from the first service chain 325 to the second service chain 326. The data plane by-pass notification mechanism may provide faster re-routing (e.g., lower latency) than the control plane by-pass notification mechanism.

Figure 4:
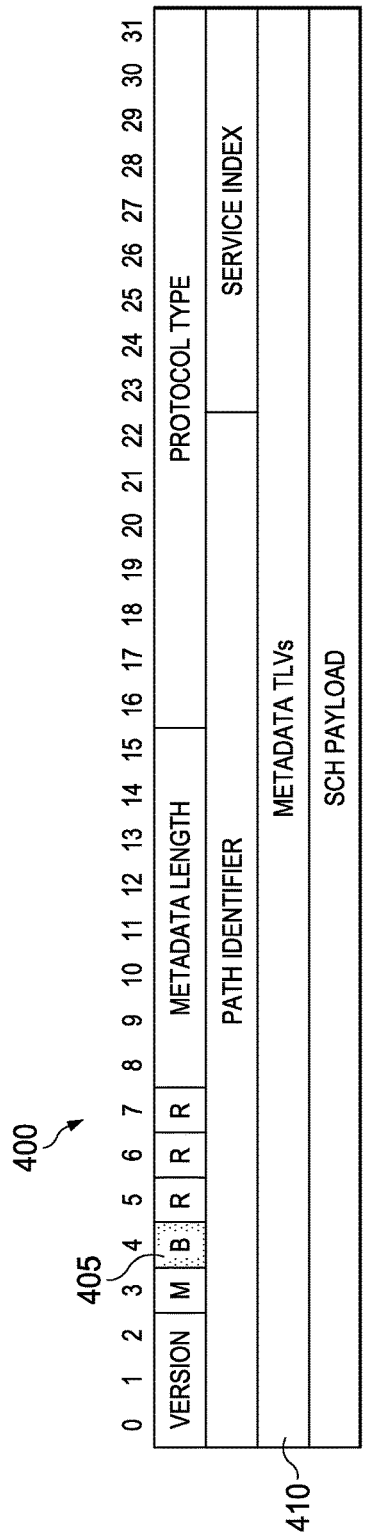
FIG. 4 illustrates a diagram of an embodiment service chain header.

A by-pass indication may be signaled using a dedicated by-pass indication bit/flag in a service chain header. FIG. 4 illustrates an embodiment service chain header (SCH) 400 comprising a by-pass bit flag. The service by-pass bit 405 (e.g., the B bit) may be set (or cleared) to signal a by-pass indication. For example, a service function instance may set (or clear) the service by-pass bit 405 in the SCH 400 of a data packet prior to sending the packet to the service function forwarder. Upon receiving the packet carrying the service by-pass bit 405, the service function forwarder may re-route a remaining portion of the specified traffic flow around the service function instance. The service function forwarder may clear (or set) the service by-pass bit 405 in the SCH before forwarding the packet to the next downstream SFF. In addition to the by-pass indication bit 405, the SCH 400 may include a metadata TLV field 410. The metadata TLV field 410 may be a variable length field that carries one or more TLVs, e.g., a by-pass flow descriptor TLV, a traffic flow descriptor TLV, a sample flow descriptor TLV, etc.

Figure 5:
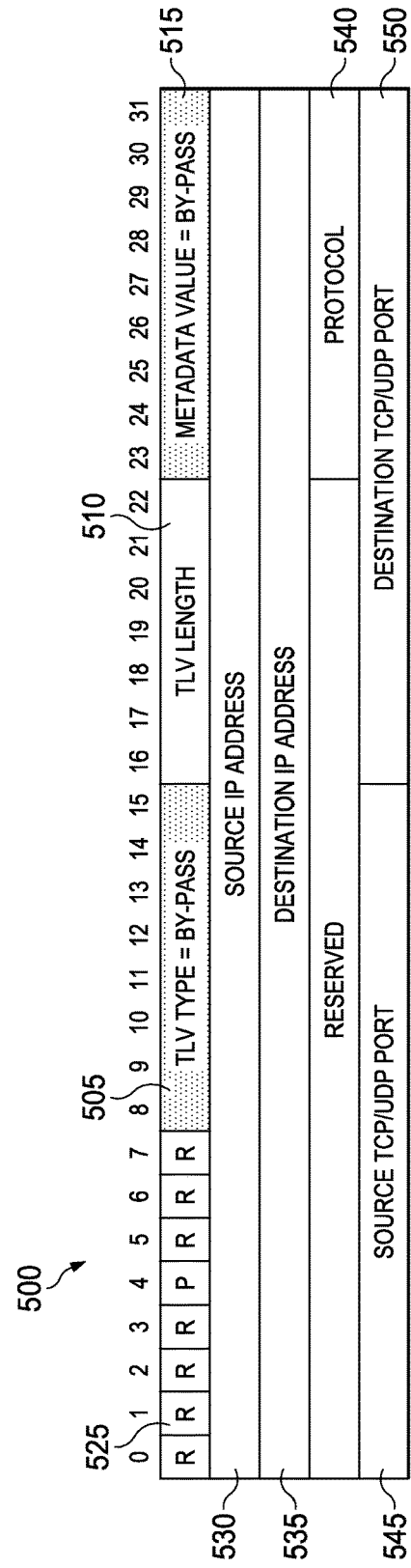
FIG. 5 illustrates a diagram of an embodiment by-pass flow descriptor type length value (TLV) structure.

A by-pass indication may also be signaled by including a by-pass flow descriptor TLV in the SCH 400. FIG. 5 illustrates an embodiment by-pass flow descriptor TLV 500 adapted to signal a by-pass indication. As shown, the by-pass flow descriptor TLV 500 comprises a TLV type field 505, a TLV length field 510, a metadata value field 515, a group of reserved bits (Rs) 525, a source internet protocol (IP) address 530, a destination IP address 535, a protocol 540, a source transmission control protocol/user datagram protocol (TCP/UDP) port 545, and a destination TCP/UDP port 550. A service function instance may add the by-pass flow descriptor TLV 500 to the metadata TLV field 410 of the SCH 400 in order to signal a by-pass notification to a service function forwarder. The TLV type field 505 and the metadata value field 515 in the by-pass flow descriptor TLV 500 may be set to a certain bits pattern to indicate remaining packets in a traffic flow are to be sent directly to the next-hop service function instance. The source/destination IP addresses 530, 535, the protocol 540, and the source/destination TCP/UDP ports 545, 550 are used to identify the traffic flow to be by-passed. The service function forwarder may remove the by-pass flow descriptor TLV 500 from the SCH before forwarding the packet to the next downstream SFF as it only has significance between the reporting service function and its service function forwarder.

Figure 6:
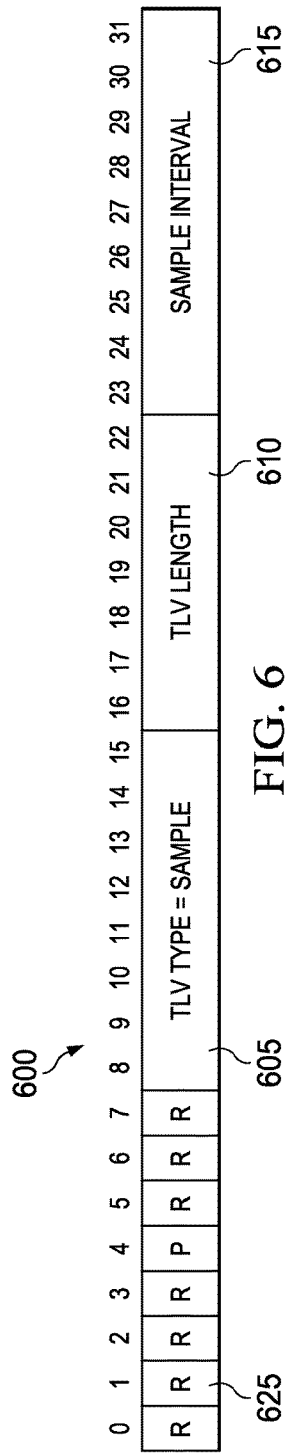
FIG. 6 illustrates a diagram of an embodiment sampling flow descriptor type length value (TLV) structure.

In some embodiments, a by-passed service function instance may want to periodically sample a packet (or a group of packets) in the re-routed traffic flow. This can be accomplished by including a sampling indication (e.g., a sample flow descriptor TLV field, etc.) in the SCH 400. FIG. 6 illustrates an embodiment sampling flow descriptor TLV 600 comprising a TLV type field 605, a TLV length field 610, a sample interval value field 615, and a group of reserved bits (Rs) 625. A service instances may add the sampling flow descriptor TLV 600 to the SCH 400 in order to request that the service function forwarder send one or more of the flow packets to the by-passed service function instance at some points in the future so that the by-passed service function instance may sample the packet(s). The sampling flow descriptor TLV 600 may also be included in the SCH 400 of sampled packet(s) to request that the service function forwarder resume forwarding of the traffic flow to the previously by-passed service function instance. The TLV type field 605 and the sample interval field 615 in the sampling flow descriptor TLV 600 may be set to a certain bit pattern to signal a sample or resume operation. The sample interval value 615 may specify the number of packets to be skipped, or as a time interval between sampled packets. The service function forwarder may remove the sample flow descriptor TLV 600 from the SCH before forwarding the packet to the next downstream SFF.

As an example, the sampling flow descriptor TLV 600 may accompany a by-pass indication in the SCH 400 of a packet to indicate that the service function instance wants to sample an occasional packet in remaining portions of the traffic flow, which will largely by-pass the service function instance by virtue of the by-pass indication. In another example, the sampling flow descriptor TLV 600 may be included in the SCH 400 of sampled packet(s) to indicate that the service function instance wants to resume receiving the flow.

Aspects of this disclosure allow for service off-loading from service nodes. This allows service nodes to offer a greater service capacity as only the first few packets of a flow need to be sent to the service function instance running a service node. This allows fewer service nodes to be deployed in the network, resulting in cost savings and reduced CAPEX. Aspects of this disclosure improve latency of the packet flow as remaining portions of a traffic flow are expeditiously forwarded to the next hop service function instance, thereby reducing transit times. This also results in improved quality of service, as the packet latency for packet flows is reduced. Aspects of this disclosure reduce network traffic since subsequent packets for the flow do not need to be steered through the network to that service node.

Figure 7:
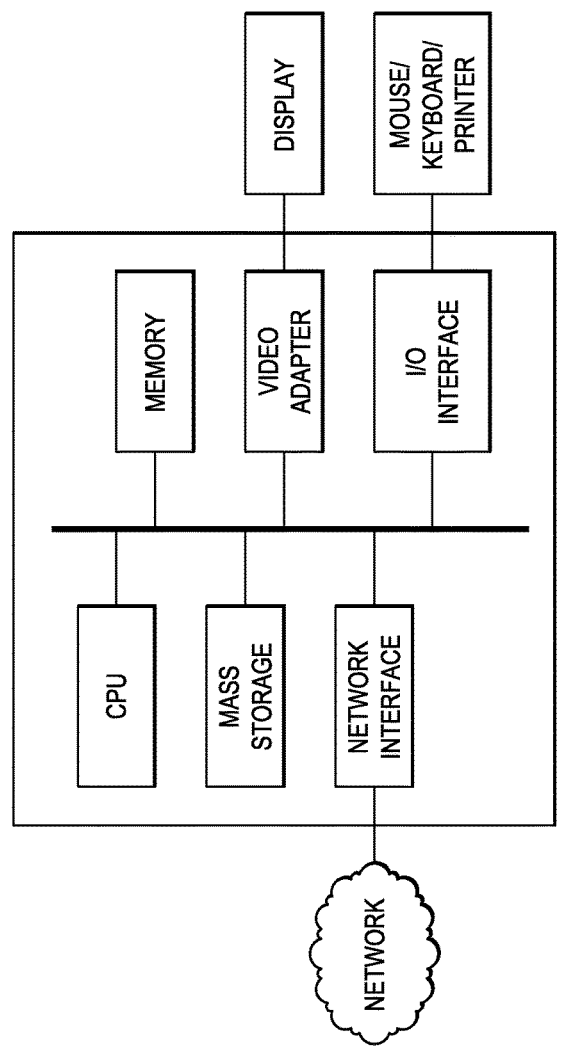
FIG. 7 illustrates a diagram of an embodiment computing platform.

FIG. 7 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for dynamically by-passing service function instances using data plane signaling, the method comprising:
    receiving, by a service function instance, a packet of an initial portion of a traffic flow over a service chain path and processing the packet at the service function instance, the packet preceding one or more remaining packets in the traffic flow, wherein the service function instance is positioned between an upstream service function instance and a downstream service function instance on a service chain path;
    determining, by the service function instance, that a by-pass criterion is satisfied after processing the packet at the service function instance, and based thereon embedding, by the service function instance, a by-pass indication in a service chain header of the packet; and
    forwarding the packet to a data plane entity, the by-pass indication embedded in the service chain header of the packet of the traffic flow instructing the data plane entity to re-route the one or more remaining packets of the traffic flow directly from the upstream service function instance to a next-hop service function instance such that the one or more remaining packets of the traffic flow bypass the service function instance.

2. The method of claim 1, wherein the by-pass indication comprises a dedicated field in the service chain header.

3. The method of claim 2, wherein embedding the by-pass indication in the service chain header of the packet comprises:
    setting or clearing the by-pass indication in the service chain header to signal the by-pass indication.

4. The method of claim 1, wherein the by-pass indication comprises a by-pass flow descriptor type length value (TLV).

5. The method of claim 4, wherein embedding the by-pass indication in the service chain header of the packet comprises:
    placing the by-pass flow descriptor TLV in a metadata TLVs of the service chain header.

6. The method of claim 1, further comprising:
    embedding, by the service function instance, a sampling indication in the service chain header of the packet, wherein the sampling indication prompts the data plane entity to occasionally forward one or more sampled packets of the traffic flow to the service function instance such that the service function instance can sample the one or more sampled packets, the packet preceding the one or more sampled packets, the one or more sampled packets being different than the one or more remaining packets.

7. The method of claim 6, wherein the sampling indication comprises a sample flow descriptor TLV.

8. The method of claim 7, wherein embedding the sampling indication in the service chain header comprises:
    placing the sample flow descriptor TLV in metadata TLVs of the service chain header.

9. The method of claim 6, further comprising:
    receiving, by the service function instance, the one or more sampled packets, the one or more sampled packets being communicated to the service function instance in accordance with the sampling indication;
    determining that a resume criterion has been satisfied after at least partially processing the one or more sampled packets;
    embedding, by the service function instance, a resume indication in a service chain header of the one or more sampled packets; and
    sending the one or more sampled packets to the data plane entity, wherein the resume indication prompts the data plane entity to resume forwarding residual packets of the traffic flow to the service function instance, the residual packets being preceded by the one or more sampled packets in the traffic flow.

10. The method of claim 9, wherein embedding the resume indication in the service chain header of the sampled packet comprises:
    embedding a resume flow descriptor TLV in metadata TLVs of the service chain header of the one or more sampled packets.

11. An apparatus adapted to host a service function instance of a service chain, the apparatus comprising:
    a processor; and
    a computer readable storage medium storing programming for execution by the processor, the programming including instructions to:
        receive a packet of an initial portion of a traffic flow over a service chain path and processing the packet at the service function instance, the packet preceding one or more remaining packets in the traffic flow, wherein the service function instance is positioned between an upstream service function instance and a downstream service function instance on the service chain path;
        determine that a by-pass criterion is satisfied after processing the packet at the service function instance, and based thereon embed a by-pass indication in a service chain header of the packet; and
        forward the packet to a data plane entity, the by-pass indication embedded in the service chain header of the packet of the traffic flow instructing the data plane entity to re-route the one or more remaining packets of the traffic flow directly from the upstream service function instance to a next-hop service function instance such that the one or more remaining packets of the traffic flow bypass the service function instance.

12. The apparatus of claim 11, wherein the by-pass indication comprises a dedicated field in the service chain header.

13. The apparatus of claim 11, wherein the by-pass indication comprises a by-pass flow descriptor type length value (TLV).

14. The apparatus of claim 11, wherein the programming further includes instructions to:
    embed a sampling indication in the service chain header of the packet, wherein the sampling indication prompts the data plane entity to occasionally forward one or more sampled packets in the remaining portion of the traffic flow to the service function to enable the service function instance to sample the one or more sampled packets, the packet preceding the one or more sampled packets, the one or more sampled packets being different than the one or more remaining packets.

15. The apparatus of claim 14, wherein the programming further includes instructions to:
   receive the one or more sampled packets from the remaining portion of the traffic flow, the one or more sampled packets being communicated to the service function instance in accordance with the sampling indication;
   determine that a resume criterion has been satisfied after at least partially processing the one or more sampled packets;
   embed a resume indication in a service chain header of the one or more sampled packets; and
   send the one or more sampled packet to the data plane entity, wherein the resume indication prompts the data plane entity to resume forwarding residual packets of the traffic flow to the service function instance, the residual packets being preceded by the one or more sampled packets in the traffic flow.

16. A method for dynamically by-passing service function instances using control plane signaling, the method comprising:
   receiving, by a control plane entity, a by-pass indication message from a reporting service function instance while a traffic flow is being forwarded over a first service chain path, wherein the reporting service function instance is positioned between an upstream service function instance and a next-hop service function instance on the first service chain path, and wherein the by-pass indication message is received after a packet of the traffic flow has been processed by the reporting service function instance, the packet preceding one or more remaining packets in the traffic flow; and
   sending, by the control plane entity, a re-routing request message to the upstream service function instance, wherein the re-routing request message prompts the upstream service function instance to forward the one or more remaining packets of the traffic flow directly to the next-hop service function instance such that the one or more remaining packets of the traffic flow bypass the reporting service function instance.

17. The method of claim 16, wherein the one or more remaining packets are forwarded over a second service chain path extending directly from the upstream service function instance to the next-hop service function instance, the second service chain path excluding the reporting service function instance.

18. The method of claim 17, wherein the second service chain path was established prior to the control plane entity receiving the by-pass indication.

19. The method of claim 17, further comprising:
   dynamically establishing the second service chain path after receiving the by-pass indication.

20. An apparatus adapted to host a control plane entity, the apparatus comprising:
   a processor; and
   a computer readable storage medium storing programming for execution by the processor, the programming including instructions to:
      receive a by-pass indication message from a reporting service function instance while a traffic flow is being forwarded over a first service chain path, wherein the reporting service function instance is positioned between an upstream service function instance and a next-hop service function instance on the first service chain path, and wherein the by-pass indication message is received after a packet of the traffic flow has been processed by the reporting service function instance, the packet preceding one or more remaining packets in the traffic flow; and
      send a re-routing request message to the upstream service function instance, wherein the re-routing request message prompts the upstream service function instance to forward the one or more remaining packets of the traffic flow directly to the next-hop service function instance such that the one or more remaining packets of the traffic flow bypass the reporting service function instance.

* * * * *